UNITED STATES PATENT OFFICE.

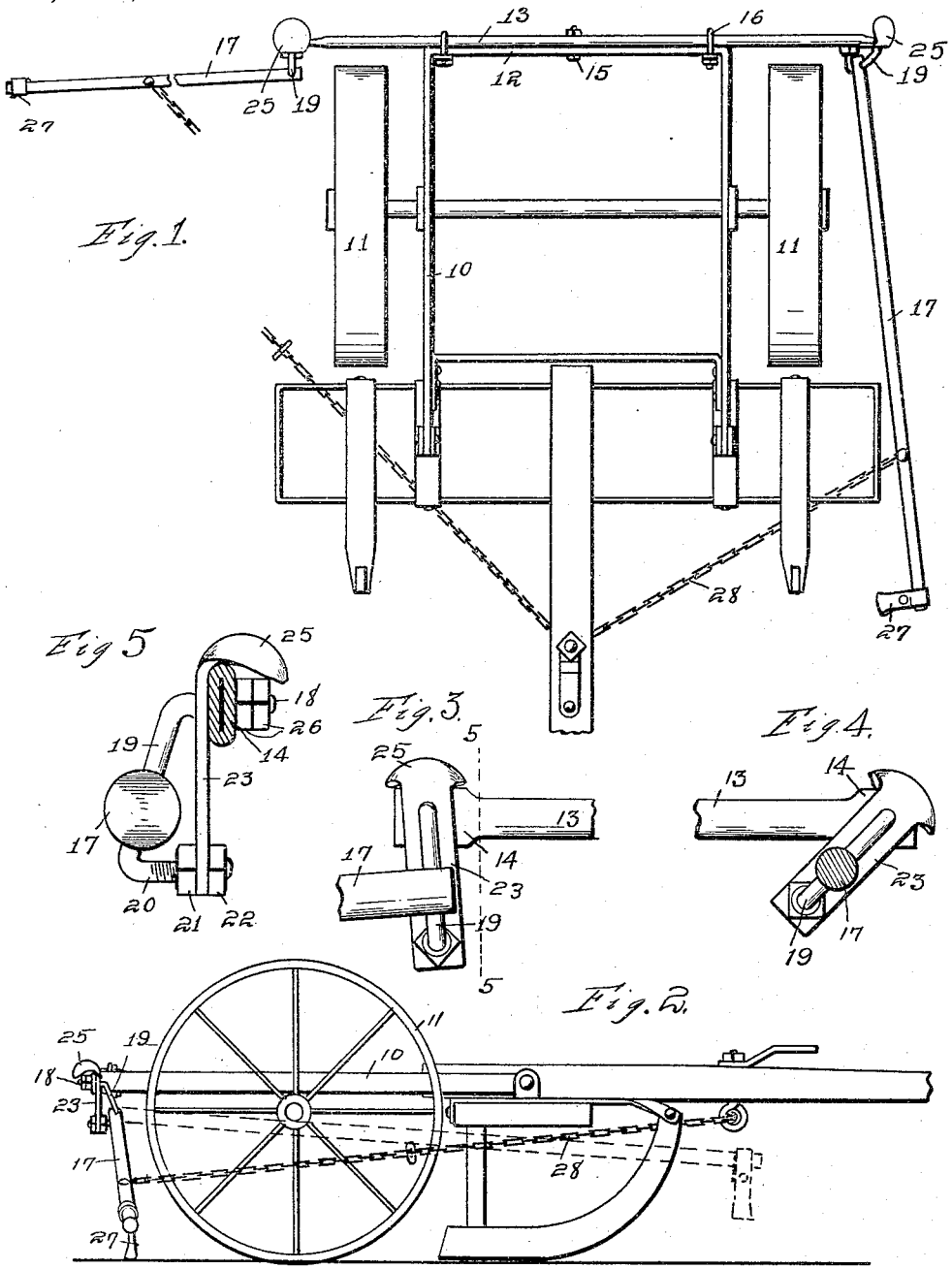

LEROY J. LINDSAY, OF SEYMOUR, IOWA.

MARKER FOR CORN-PLANTERS.

1,198,730.  Specification of Letters Patent. Patented Sept. 19, 1916.

Application filed June 5, 1916. Serial No. 101,750.

*To all whom it may concern:*

Be it known that I, LEROY J. LINDSAY, a citizen of the United States, and resident of Seymour, in the county of Wayne and State of Iowa, have invented a certain new and useful Marker for Corn-Planters, of which the following is a specification.

The object of my invention is to provide a marker for corn planters which is an improvement upon my marker shown in my patent issued July 14, 1914, No. 1,103,593.

A further object is to provide a marker of simple, durable and inexpensive construction, which can readily and easily be taken apart or put together and assembled on a corn planter, and which is so constructed and arranged that it cannot be improperly put together when installed on the planter.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a corn planter equipped with a marker embodying my invention. Fig. 2 shows a side elevation of the same. Fig. 3 shows a front elevation of the cross bar and the means for securing the marker arm thereon. Fig. 4 shows a front elevation of the cross bar showing the position of the means for fastening the marker arm thereon when the marker arm is extended forwardly alongside the planter, and Fig. 5 shows a detail, sectional view, taken on the line 5—5 of Fig. 3.

In the accompanying drawings I have used the reference numeral 10 to indicate generally the frame of a corn planter mounted on the wheels 11, and including the rear transverse frame member.

My marker such as shown in my prior patent above referred to will do excellent work when properly assembled and installed, but I have found that farmers and others frequently install the cross bar which is secured to the frame of the planter, up-side-down. When this is done the marker arms will not work properly and they are sometimes broken before the difficulty is discovered. I have, therefore, provided a cross bar 13 preferably comprising a tube having the flattened ends 14 with flat vertical faces, as clearly shown, especially in Figs. 3 and 5. The cross bar 13 is secured to the frame member 12 by means of the bolt 15 extended through the frame member 12 and the bar 13 and by means of U-bolts 16. The flattened ends 14 of the bar 13 are each provided with a central horizontal opening. It will be obvious that the bar 13 cannot be improperly installed on the frame of the planter. The bar may be turned up-side-down or end-for-end, without in any way affecting its usefulness or the manner in which it performs its functions.

At each end of the transverse bar 13 is secured a marker arm 17, in a manner now to be described.

Extended through the openings in the flattened ends 14 is a rod 18 having at its forward end a portion 19, which in one position of the parts extends downwardly and forwardly, as shown in Fig. 5. The extension 19 is extended through the marker arm 17, as shown in said figure.

At the lower end of the extension 19 is a horizontal rearwardly extending portion 20 which is screw-threaded to receive nuts 21 and 22. Mounted on the portion 20 between the nuts 21 and 22 is a bar 23 which, when the extension 19 is in the position shown in Fig. 5, extends upwardly. The bolt 18 extends through the upper portion of the bar 23 which rests adjacent to the flattened end 14.

At the upper end of the bar 23 is formed a rearwardly extending hood 25 which stands above the flattened end 14 and has preferably a convex upper and outer surface, as shown. Each of the marker arms 17 is secured to the cross bar 14 in the same way.

When the marker arm is in position for use it is extended laterally away from the rear end of the corn planter and downwardly, as shown in Fig. 2 and at the left hand side of Fig. 1. On the bolt 18 are nuts 26. The bolt 18 is rotatably mounted in the flattened end 14 and when the marker arm 17 is in the position shown in Fig. 2 the extension 19 is inclined from the bolt 18 downwardly and forwardly, as shown in Figs. 2 and 3, and also slightly inwardly, as illustrated in Fig. 3.

The marker arms have at their outer ends marker devices 27.

The marker arms 17 are connected by a chain 28 or other flexible device, secured to said marker arms near their outer ends and extended across the front part of the planter, as shown in Fig. 1. The chain 28 is of such length that when one arm 17 is in the position shown in Fig. 2, the other arm 17 will be drawn up alongside the planter, as shown at the right hand side of Fig. 1.

Assume that the marker arms are in the position shown in Fig. 2 and at the right hand side of Fig. 1 respectively, when the machine has been driven across the field then when the machine is turned around it is turned toward the marker arm at the right hand side of the machine (which is the left hand marker arm in Fig. 1). The marker arm which is alongside the machine will drop by gravity to the ground, whereupon its marker device 27 will drag in the dirt, and as the planter continues to turn the left hand marker arm will assume the position extending laterally and downwardly from the machine, and the right hand marker arm will be drawn up to the position shown in the dotted lines in Fig. 2.

On account of the fact that the extension 19 is inclined forwardly in the machine as well as downwardly, it will be seen that when one of the arms 17 is moved from its laterally extending position to position alongside the planter, its free end will be raised as well as moved toward the machine. The extension 19 and the bar 23 will then assume their positions shown in Fig. 4, in which the extension 19 inclines from the bolt 18 downwardly and forwardly and also inwardly with relation to the machine. The inward inclination of the extension 19 is much greater when the arm 17 is in the position shown by dotted lines in Fig. 2 than when said arm is in its position shown by full lines in said figure.

One of the problems involved in the making of a marker of this kind is to provide some sort of a flat surface or bearing for the upper portion of the bar 13, which is desirable to reduce the strain of the bolt 18 on the end 14 or its equivalent, during the actual operation of the marker arms. The use of the bar 23 or its equivalent is desirable for the purpose of reinforcing and strengthening the extension 19 and the parts connected therewith, thereby forming a proper support for the marker arm 17.

Where such a flat surface is provided it is found that in traveling across the field the buttons on the planter wire tend to catch at the upper edge of the flat surface and the wire is sometimes broken. To avoid this catching of the buttons on the planter wire, I have provided the hood 25 on the bar 23. The catching of the buttons may be avoided by lowering the outer ends of the bar 13 or its equivalent, but it is not considered desirable to so lower the ends, for the reason that if this is done then if the marker arm which is extended away from the machine should catch at its outer end during the turning movement, either the marker arm or the tongue may be broken.

Where the ends of the bar 13 are at a substantial height above the ground, as in my device as herein shown, then if the outer end of the marker arm which is down should be caught during the turning of the machine, instead of breaking the tongue or the marker arm one side of the machine will be slightly raised and the driver immediately warned of the difficulty.

The advantages of my improved marker may be largly seen from the foregoing description.

The parts are so constructed and arranged that practically they cannot be improperly installed on the machine.

The bar 13 is reversible and is in position for use no matter how it may be fastened on the frame.

The portion 20 and the bar 23 thoroughly reinforce and brace the extension 19, and it is highly improbable that the bolt 18 and bar 23 would be improperly installed on the bearing 13.

Some changes may be made in the arrangement and construction of the parts of my improved marker, and it is my intention to cover by my present application any such changes which may be reasonably included within the scope of my claims.

I claim as my invention:

1. In a device of the class described, a transverse bar adapted to be mounted on the frame of a corn planter, a horizontal bolt pivotally mounted on the end thereof, having at its forward end a portion adapted in one position of said bolt to extend downwardly and forwardly, said portion having at its lower end a rearward extension, a bar mounted on said extension and extended upwardly adjacent to the end of said first bar, said bolt being extended through said last described bar, and a marker arm pivotally mounted on said first described extension.

2. In a device of the class described, a transverse bar adapted to be mounted on the frame of a corn planter, a horizontal bolt pivotally mounted on the end thereof, having at its forward end a portion adapted in one position of said bolt to extend downwardly and forwardly, said portion having at its lower end a rearward extension, a bar mounted on said extension and extended upwardly adjacent to the end of said first bar, said bolt being extended through said last described bar, a marker arm pivotally mounted on said first described extension, and a hood on the upper end of said second bar.

3. In a device of the class described, a transverse bar adapted to be mounted on the frame of a corn planter, a horizontal bolt pivotally mounted on the end thereof, having at its forward end a portion adapted in one position of said bolt to extend downwardly and forwardly, said portion having at its lower end a rearward extension, a bar mounted on said extension and extended upwardly adjacent to the end of said first bar, said bolt being extended through said last described bar, and a marker arm pivotally mounted on said first described extension, said first bar comprising a tubular member having a central opening to receive a bolt, and having vertical flattened ends.

Des Moines, Iowa, May 22, 1916.

LEROY J. LINDSAY.